Oct. 6, 1953     C. S. PRESENZ     2,654,845
VAPOR DETECTOR

Filed Nov. 7, 1952     4 Sheets-Sheet 1

INVENTOR.
CECIL S. PRESENZ
BY
*Roland A. Anderson*
ATTORNEY

Oct. 6, 1953 C. S. PRESENZ 2,654,845
VAPOR DETECTOR
Filed Nov. 7, 1952 4 Sheets-Sheet 2

INVENTOR.
CECIL S. PRESENZ
BY
*Roland A. Anderson*
ATTORNEY

Oct. 6, 1953   C. S. PRESENZ   2,654,845
VAPOR DETECTOR
Filed Nov. 7, 1952   4 Sheets-Sheet 3

INVENTOR.
CECIL S. PRESENZ
BY
ATTORNEY

Patented Oct. 6, 1953

2,654,845

UNITED STATES PATENT OFFICE 2,654,845

VAPOR DETECTOR

Cecil S. Presenz, Berkeley, Calif., assignor to the United States of America as represented by the United States Atomic Energy Commission Application November 7, 1952, Serial No. 319,231

6 Claims. (Cl. 250—43.5)

The present invention relates to a vapor detector and more particularly to a portable device for detecting toxic concentrations of contaminants in the atmosphere.

Vapor detectors of the quantitative type have been developed to operate on the principle that the vapors to be detected will absorb light of certain wave lengths. By determining the quantity of light absorbed, it is possible to indicate whether the concentration is toxic or not. The present discussion will be limited to those detectors which have been principally designed to indicate the presence of toxic concentrations of mercury vapor since the present invention lies in such field. In such detectors, as developed in the past, there is provided an ultraviolet lamp which emits light having a wave length of 2537 Angstroms. Since such an ultraviolet lamp is a mercury arc light source, it will be clearly apparent that mercury vapor will absorb light of such wave length very readily. It has been found that the known detectors have two principal disadvantages, one being the necessity of manual starting of the ultraviolet lamp and the other being an inherently slow resolving time.

Such disadvantages are overcome in the present invention by providing a more sensitive detection unit, a faster resolving bridge and associated electric circuit, and a circuit for the ultraviolet lamp which includes an automatic restart system. The latter feature is extremely important in that the detector can be left unattended without fear that a momentary line failure will render the device inoperable.

It is therefore an object of the present invention to provide a new and improved vapor detector.

Another object of the invention is to provide a vapor detector having an automatic restart circuit for the ultraviolet lamp thereof.

A further object of the present invention is to provide a vapor detector with an efficient vapor chamber through which ultraviolet light is projected substantially without reflections from the surfaces thereof.

A still further object of the invention is to provide a vapor detector in which the components have been designed to operate in a small portable carrying case.

Another important object of the invention is to provide a mercury vapor detector having a pair of phototubes connected respectively into opposing sides of a balanced circuit and viewing the same source of ultraviolet light.

Still another object of the invention is to provide an easily constructed vapor detector utilizing simple circuitry and which is sensitive but simple to operate.

Other objects and advantages of the invention will be apparent from the following description and claims considered together with the accompanying drawing, in which:

Figure 1:
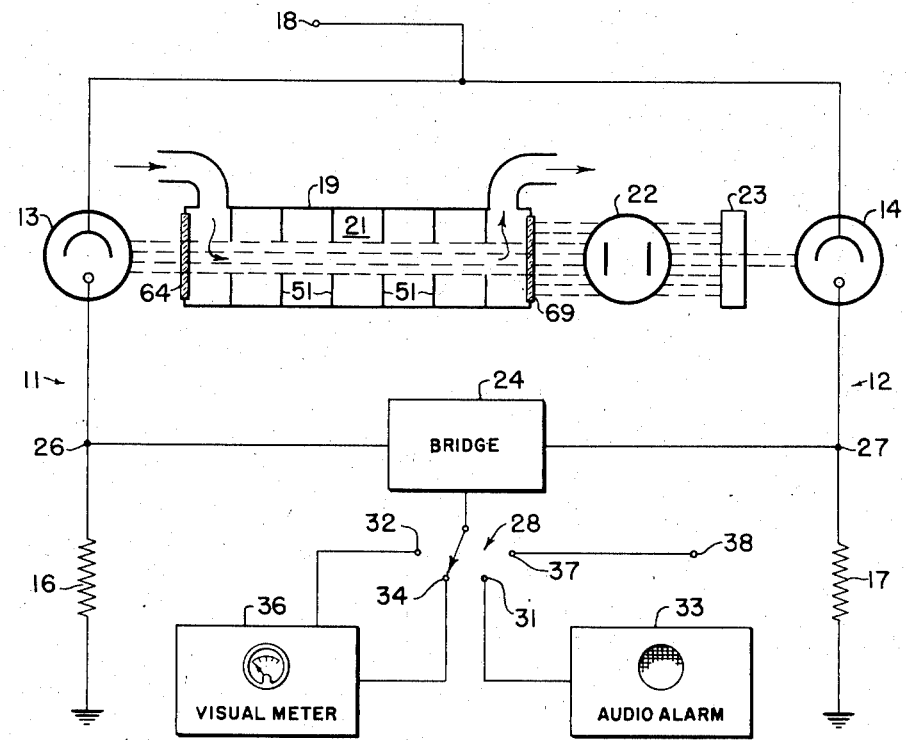
Figure 1 is a schematic diagram of the invention.

Referring to the drawing, Fig. 1 in particular, it is to be noted that there is provided a balanced network comprising two parallel-connected combinations 11 and 12 of a series-connected phototube 13, 14 and resistor 16, 17, respectively. The junction between the two phototubes 13, 14 is connected to a source 18 of positive potential while the junction between the two resistors 16, 17 is connected to ground.

Disposed between the two phototubes 13 and 14 is a cylindrical tube 19 forming a vapor chamber 21, an ultraviolet lamp 22 and an iris 23 in such order. To determine unbalance conditions between the two combinations 11 and 12, a bridge circuit 24 is connected between points 26 and 27 thereof, respectively. The output of such bridge circuit 24 is connected to a selector switch 28, one position 31 of which is connected to an audio alarm unit 33, two positions 32 and 34 to a visual meter 36, and a final position 37 to a remote connection terminal 38.

From such general description of the invention, it will be apparent that the bridge circuit 24 can be balanced when the chamber 21 is clear of vapor by adjusting the iris 23 so that equal quantities of light from the ultraviolet lamp 22 reach the phototubes 13 and 14. Such iris 23 is necessary because the two phototubes are placed different distances from the lamp 22. With the bridge circuit 24 balanced in such manner, air is circulated through the chamber 21. When a vapor enters the chamber 21 which absorbs light of the wave length of the ultraviolet light (2537 Angstroms), the quantity of such light reaching the phototube 13 is decreased to unbalance the bridge. The unbalance then results in an output voltage from the bridge circuit 24 and is transmitted to the selected one of the audio alarm unit 33, the visual meter 36, or the remote terminal 38.

Figure 3:
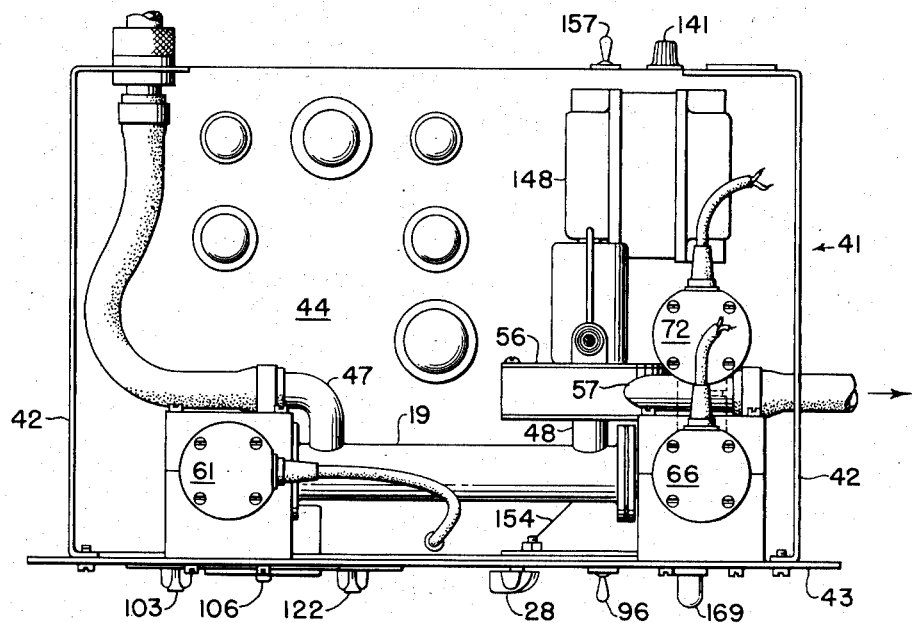
Figure 3 is a plan view of the present invention of Fig. 1 as mounted in a portable carrying case.
Figure 4:
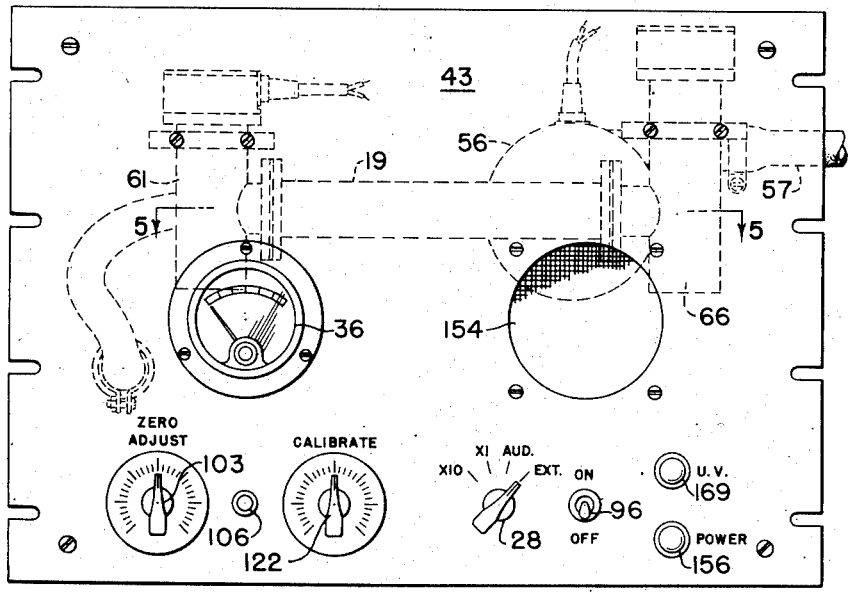
Figure 4 is an elevational view of the invention as shown in Fig. 3.
Figure 5:
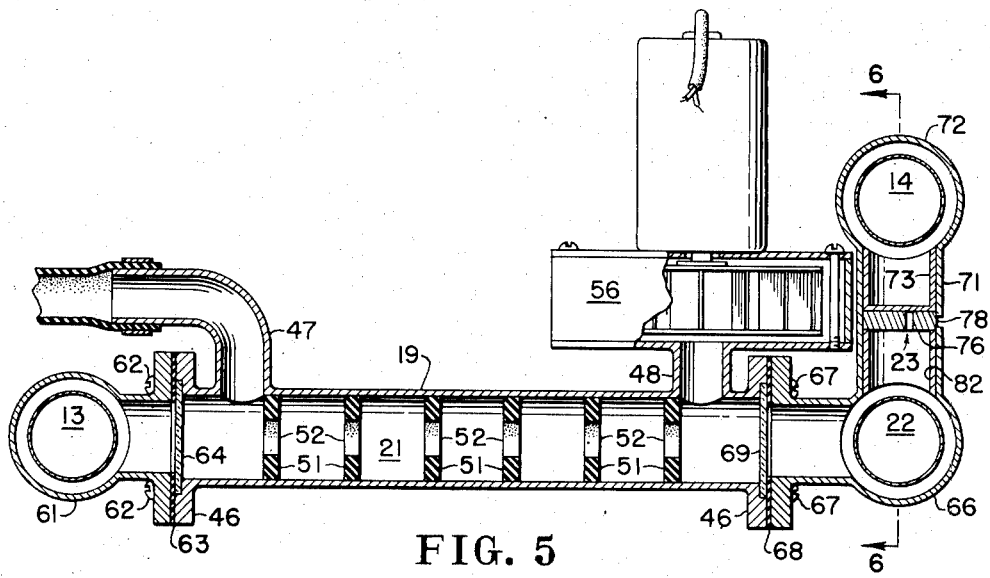
Figure 5 is a sectional view of the vapor chamber of the invention taken along the line 5—5 of Fig. 4.
Figure 6:
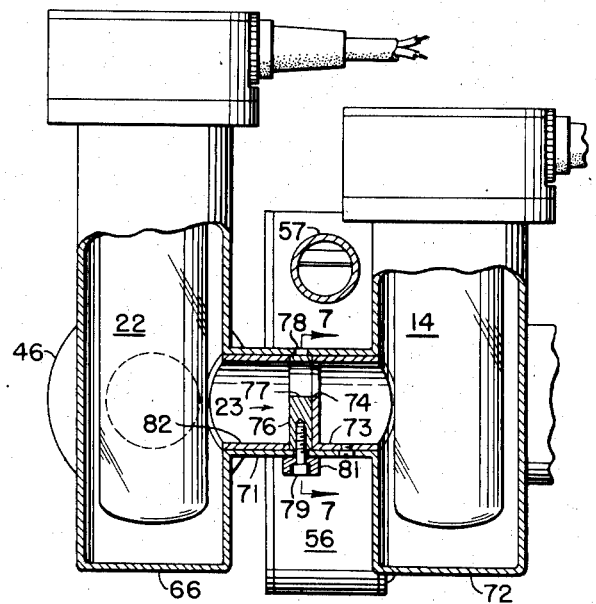
Figure 6 is a view taken along the line 6—6 of Fig. 5.
Figure 7:
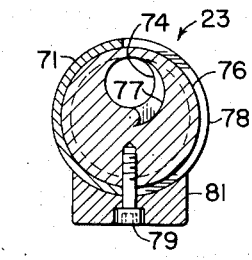
Figure 7 is a view taken along the line 7—7 of Fig. 6.

Referring now to Figs. 3 and 4 of the drawing, it is seen that there is provided a portable carrying case 41 for the invention and having, in addition to enclosing walls 42, a front panel 43 for mounting necessary controls, and a chassis 44 for rigidly mounting the circuit elements. Mounted conventionally on the panel 43, internally of the case 41, is the assembly comprising the cylindrical tube 19, phototubes 13 and 14, ultraviolet lamp 22, and iris 23. Such assembly is preferably made unitary and in a light-tight manner. The vapor chamber 21 itself is formed by the elongated metallic cylinder 19 which is open at either end (see Fig. 5) and provided with flanged portions 46 at such ends. An intake pipe 47 is mounted transversely of the cylinder 19 in communication therewith and an outlet pipe 48 is similarly mounted at the other end. Mounted within the cylinder 19 between the inlet and outlet pipes 47 and 48 are a plurality of baffles 51 having aligned apertures 52 therein. Preferably such baffles 51 are of a nonreflective material, such as rubber, and of a dimension which prevents light reflections from the interior wall of the cylindrical tube 19 reaching the end of the chamber 21. To provide for movement of air and vapor through the chamber 21, a motor driven exhaust fan 56 is mounted on the outlet pipe 48 with an exhaust pipe 57 extending therefrom.

A housing 61 is suitably mounted as by screws 62, on the flange 46 at the intake end of the cylinder 19 with a light and gas-tight seal 63 clamped therebetween. Also, sealed between the housing 61 and the flange 46 is a window 64 preferably quartz, which is transparent to light having a wave length of 2537 Angstroms. Disposed axially within such housing 61 is the phototube 13 with the window thereof aligned with the window 64. The electrical connections of the phototube 13 have been stated previously in general terms and will be discussed in detail hereinafter.

At the other end of the chamber 21 a second housing 66 is similarly mounted by screws 67 to the flange 46 of the metallic cylinder 19; i. e., a seal 68 and quartz window 69 is clamped between the second housing and the cylinder. Suitably mounted within the housing 66 is the ultraviolet lamp 22 so that the light therefrom is projected through the chamber 21 toward the phototube. In the illustration of the invention (Figs. 3–5), it is to be noted that a second light channel, comprising a tubular extension 71 extends from the housing 66 at right angles to the center line of the chamber 21 and is terminated in a third housing 72. Such arrangement has been provided to decrease the longitudinal dimension of the combination for mounting within as small a longitudinal dimension as possible. Disposed within the housing 72 is the other phototube 14 so that light extending through the passage 71 from the ultraviolet lamp 22 will fall upon the light-sensitive element of the phototube. The electrical connections for the ultraviolet lamp 22 and phototube 14 will be set forth in detail hereinafter.

So that the bridge circuit of which the phototubes 13 and 14 are parts can be balanced, an iris 23 is mounted within the extension 71 between the ultraviolet lamp 22 and the phototube 14. A cylinder 73 having one end closed except for a circular aperture 74 therein is disposed in a fixed position within the extension 71. Disposed adjacent the closed end of the cylinder 73 is a rotatable disk 76 having an aperture 77 in the shape of a comma with the circular portion thereof aligned with the aperture 74 in the cylinder 73 and the tail portion extended so that the center of the disk lies along a line extended from the center of the circular portion to the tip of the tail portion. Thus, when the disk 76 is rotated from the position, whereby the two apertures 74 and 77 are aligned to allow a maximum quantity of light to traverse the apertures, the opening is gradually decreased until the passageway is entirely blocked. To permit manual rotation of the disk 76 from outside the extension 71, a slot 78 is provided to extend substantially 180 degrees about the periphery so that a screw 79 projecting through a slide block 81 threadedly engages the disk 76. A second cylinder 82 is disposed within the extension 71 with one end abutting the opposite face of the disk 76 to maintain the disk in position.

Figure 8:
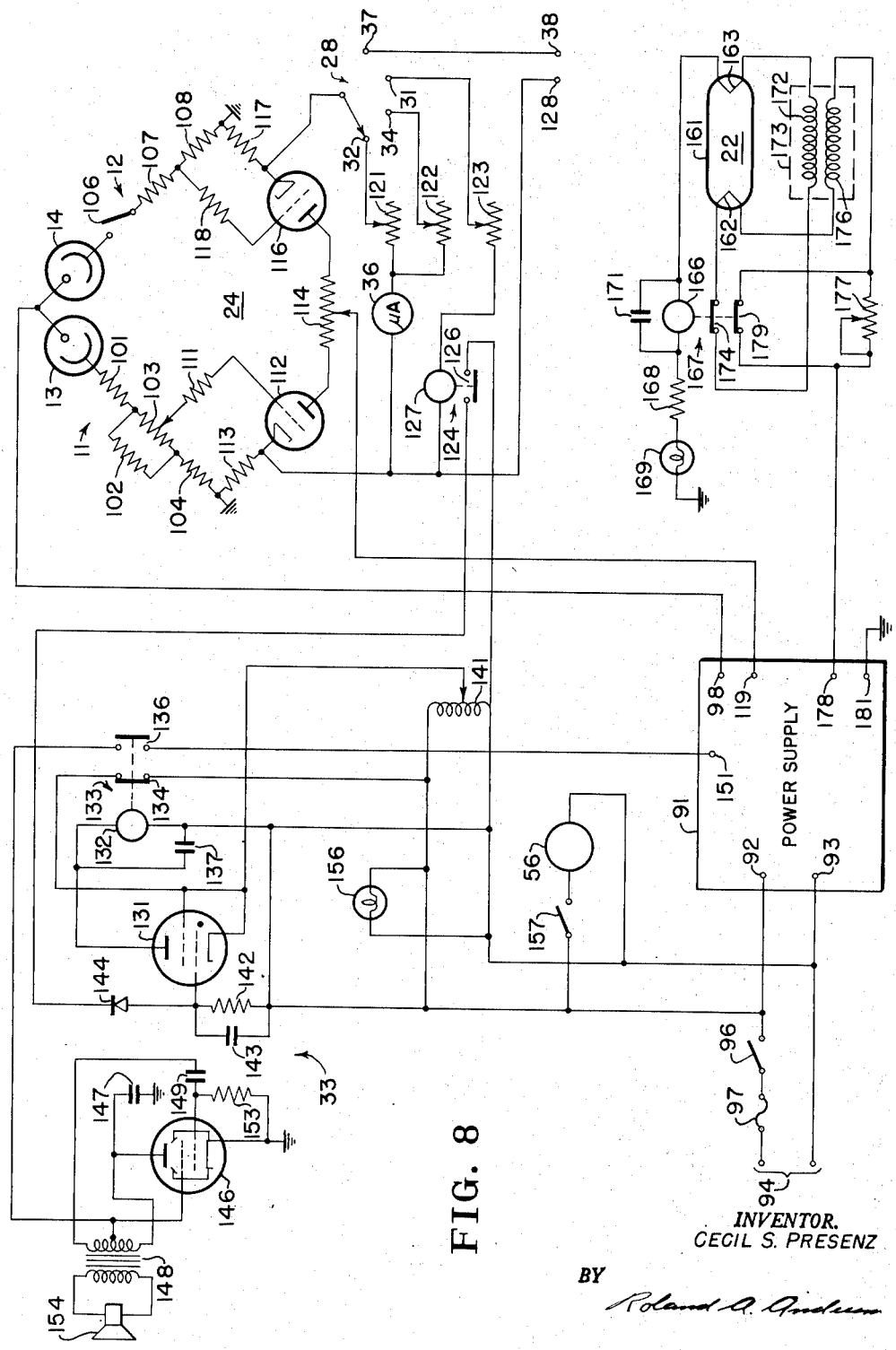
Figure 8 is a wiring diagram of the circuit of the invention.

Now consider the electrical circuitry of the invention in detail (see Fig. 8). There is provided a conventional power supply 91 having the input terminals 92 and 93, respectively, connected to a source of alternating current 94 through a switch 96 and fuse 97. One positive terminal 98 of such power supply 91 is directly connected to the junction between the phototubes 13 and 14 to furnish a suitable operating potential. A resistor 101, a parallel-connected resistor 102 and potentiometer 103, and a resistor 104 are series-connected from the phototube 13 to ground. Such resistances were lumped into a single resistor 16 in Fig. 1 for convenience. Also, a single-pole, single-throw switch 106, a resistor 107, and a resistor 108 are series-connected between the phototube 14 and ground. Here again the resistors 107 and 108 were combined as resistor 17 in Fig. 1 for the general description.

The variable arm of the potentiometer 103 is connected through a limiting resistor 111 to the control grid of a triode vacuum tube 112, the cathode of which is connected through a resistor 113 to ground and the anode of which is connected to one side of a potentiometer 114. A second triode vacuum tube 116, similar to tube 112, is connected with the cathode grounded through a resistor 117, the control grid connected through a limiting resistor 118 to the junction between the resistors 107 and 108 in the branch 12, and the anode directly joined to the other side of the potentiometer 114. Now with the variable arm of the potentiometer 114 connected to a second positive terminal 119 of the power supply 91, it is readily seen that the connections of the tubes 112 and 116 are that of a conventional vacuum tube voltmeter circuit with the potentiometer 114 available to balance the conduction of the tubes and the potentiometer 103 providing for establishing the zero set of the circuit.

The cathode of the tube 116 is connected to the swinging arm of the previously described selector switch 28. The terminal 32 of the switch 28 is connected to the adjustable arm of a potentiometer 121, the terminal 34 to the adjustable arm of another potentiometer 122, the terminal 31 to the adjustable arm of still another potentiometer 123, and, as has been previously set forth, the terminal 37 is connected to a terminal 38 for a remote warning connection. The visual meter 36 may be a microammeter or milliammeter and is connected with one side thereof to the cathode of the tube 112 and the other side to one end of each of the potentiometers 121 and 122. In such manner of connections the two potentiometers 121 and 122 provide means for changing the range covered by the visual meter 36. Also there is provided a relay 124, having a normally open contactor 126, with the solenoid 127 of such relay connected between the cathode of the tube 112 and one end of the potentiometer 123. The cathode of the tube 112 is further connected to a terminal 128 which serves as a part of the remote warning connection.

The audio alarm system comprises, in general, a trigger circuit which closes a relay to start the operation of an oscillator having a speaker coupled thereto. Such trigger circuit comprises a gaseous discharge tube 131 with the anode thereof connected to one side of the solenoid 132 of a relay 133 having a normally closed contactor 134 and a normally open contactor 136. The other side of such solenoid 132 is directly connected to the input terminal 93 of the power supply 91 and a by-pass capacitor 137 is connected in parallel with such solenoid. A further connection of the cathode of the tube 131 is made to the adjustable arm of an autotransformer 141 which in turn is connected between the two input terminals 92 and 93 of the power supply 91. The control grid of the tube 131 is connected through a parallel-connected resistor 142 and capacitor 143 to the terminal 92 of the power supply 91 and to one side of a rectifier crystal 144. The other side of such crystal 144 is connected to one side of the contactor 126 of the relay 124, the other side of which is connected to the terminal 93 of the power supply 91.

The above-referenced oscillator of the audio alarm system comprises a power amplifier tube 146. The anode of such tube 146 is connected to ground through a by-pass capacitor 147 and to one side of the center-tapped winding of a transformer 148. The other side of the center-tapped winding of the transformer 148 is connected through a coupling capacitor 149 to the control grid of the tube 146 while the center-tap of the winding is connected to the screen grid of the tube and further to one side of the contactor 136 of the relay 133. The contactor 136 is in turn connected to a positive terminal 151 of the power supply 91 as a source of operating potential for the tube 146. To complete the connections of the tube 146 a resistor 153 is connected between the control grid and cathode and the cathode is directly connected to ground. A speaker 154 is connected across the other winding of transformer 148 so that audible sound is developed whenever the oscillator circuit is operating.

To indicate loss of power to the circuit there is provided an indicating lamp 156 connected between the terminals 92 and 93 of the power supply 91. The motor for the exhaust fan 56 is connected in series with a switch 157 between the input terminals 92 and 93 of the power supply 91.

The ultraviolet lamp 22 comprises an elongated and sealed envelope 161 containing mercury vapor. Disposed at either end of the envelope 161 are separate filaments 162 and 163, respectively, with two leads suitably extending through the envelope for each filament. One of the leads of the filament 163 is connected to one side of the solenoid 166 of a relay 167, the other side of which is connected through a series-connected resistor 168 and indicating lamp 169 to ground. A storage capacitor 171 is connected in parallel with the solenoid 166 and the purpose thereof will be set forth hereinafter. The other lead of the filament 163 is connected to one side of a first winding 172 of a ballast unit 173 with the other side being connected to a normally closed contactor 174 of the relay 167. Continuing the description of the circuit path it is seen that the other side of the contactor 174 is connected to one lead of the filament 162 and that the other lead of such filament is connected to the second winding 176 of the ballast unit 173. Further, the other side of the winding 176 is connected to a potentiometer 177 which, in turn, is connected to a positive terminal 178 of the power supply 91. The adjustable arm of the potentiometer 177 is connected to one side thereof and a normally closed contactor 179 of the relay 167 is connected in parallel with the potentiometer, both of which provide means for varying the resistance of the circuit. It is to be noted that the polarities of the terminals 98, 119, 151, and 178 of the power supply 91 are each referenced with respect to a grounded terminal 181.

Figure 2:
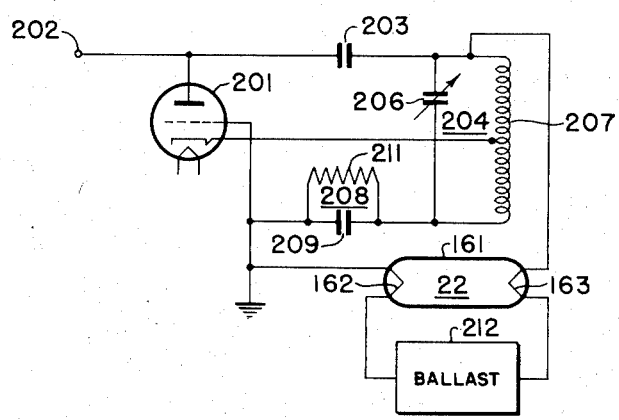
Figure 2 is a wiring diagram of an ultraviolet lamp starting circuit for the invention of Fig. 1.

An alternate circuit which can be used with the ultraviolet lamp is illustrated in Fig. 2 of the drawing. In such circuit there is provided a triode amplifier tube 201 with the anode thereof connected to a terminal 202 which can in turn be connected to a source of positive voltage, such as the terminal 178 of the power supply 91 or a battery (not shown). The anode of such tube 201 is also coupled by a capacitor 203 to one side of a tank circuit 204 comprising a parallel connected variable capacitor 206 and inductance 207. The other side of the tank circuit 204 is coupled through a low impedance circuit 208 comprising a capacitor 209 connected in parallel with a resistor 211 to ground. The control grid of the tube 201 is connected directly to ground and the cathode is connected to a center tap of the inductance 207. Thus, there has been described a conventional grounded-grid oscillator circuit. Connections are made from the tank circuit 204 to one lead of the filament 163 of the lamp 22, from the other lead of such filament to a ballast unit 212, from such ballast unit 212 to one lead of the filament 162, and from the other lead of such filament to ground to furnish a closed current path through the filaments 162 and 163 of the lamp.

Having described the structure and electrical circuit connections in detail in the foregoing paragraphs, the operation of the vapor detector will now be set forth. With the power supply 91 suitably connected to a source 94 of alternating current the switch 96 is closed to the "on" position (Fig. 4) which lights the indicator lamp 156. A time delay can be introduced between the closing of the switch 96 and the lighting of the lamp 156, if it is desired to indicate the passing of filament warm-up time. Prior to closing the switch 96 it should be determined that the switch 28 is in the "X1" or larger range position to prevent damage to the meter 36.

When the power supply 91 is operative and the voltage between the terminals 178 and 181 is suitably impressed across the circuit of the ultraviolet lamp 22, current flows in such circuit to charge the capacitor 171 and to heat the filaments 162 and 163 of the lamp. Upon discharge of the capacitor 171 through the solenoid 166 of the relay 167 the relay is actuated to open the contacts 174 and 179 which results, because of the ballast 173, in voltage transients such as to cause an arc between the filaments 162 and 163 within the lamp 22. Once the arc has been initiated through the lamp 22 the normal voltage across the lamp is sufficient to maintain operation thereof. The current path for the lamp 22 then may be traced from the positive terminal 178 of the power supply 91, through the potentiometer 177, through the ballast winding 176, through the tube 22, through the solenoid 166, through the resistor 168, and through the indicating lamp 169 to ground. From the foregoing it will be readily apparent that should the operation of the power supply 91 be interrupted momentarily the relay 167 will assume its normal starting position and the starting sequence will be commended to re-energize the lamp 22.

With the lamp 22 in operation the two tubes 112 and 116 of the bridge circuit may be balanced by adjustment of the potentiometer 114. Next with the switch 106 closed, fresh air in the chamber 21, and the switch 28 in position 32 for large range reading the potentiometer 103 is adjusted for a zero setting on the visual meter 36. To calibrate the instrument the switch 106 is opened and the potentiometer 121 adjusted for full scale deflection. To set the other scale, "X10," of the visual meter 36 the potentiometer 103 is set for a reading of one-tenth scale when the switch 28 is in position 32 so that by changing the switch 28 to position 34 the potentiometer 122 may be adjusted for a full scale deflection. Finally the switch 28 should be returned to position 32 and the potentiometer 103 readjusted for zero setting when the switch 106 is closed.

A mercury calibration may be made after the foregoing preliminary adjustments have been completed. For such calibration a small bottle of mercury (at a temperature of substantially twenty degrees centigrade) is required. The surface of the mercury should then be placed adjacent to, but not touching, the intake to the cylinder 19. Under such circumstance a reading of substantially 78 percent of the large range, "X1," of the visual meter 36 should be obtained which has been determined to be equivalent to a concentration of 3.2 milligrams of mercury per cubic meter. Should the foregoing reading not be obtained, it is advisable to recheck the preliminary adjustments and to determine that there has been no contamination of the intake and chamber system.

To test for mercury contamination of the intake and chamber system, there is provided the switch 157 which opens the circuit of the exhaust fan motor 56. With the bridge circuit properly adjusted prior to opening the switch 157, there will be a definite positive deflection after the blower has been stopped provided contamination has occurred.

There remains but one further adjustment necessary prior to actual monitoring operations and this is to set the sensitivity of the audio alarm unit. With the switch 28 in position 31 the potentiometer 123 is adjusted so that the relay 124 operates at a desired vapor level. Such adjustment may be readily made without the use of mercury vapor by using the zero set potentiometer 103 so that the equivalent of 0.1 milligram of mercury per cubic meter may be registered on the visual meter 36. Operation of the relay 124 closes the contactor 126 thereof so that a positive voltage appears at the control grid of the gaseous discharge tube 131 in phase with a positive voltage impressed at the anode of the tube through the solenoid 132 of the relay 133 during each positive half cycle of the alternating voltage of the source 94. The result of such operation is that the tube 131 is alternately conductive and non-conductive in accordance with the frequency of the alternating voltage and current flows through the solenoid 132 of the relay 133 only when the tube is conductive. Each time current flows through the solenoid 132 of the relay 133 the relay is operated to close the contactor 136 and open the other contactor 134. The opening of the latter contactor serves to decrease the voltage across the tube 131 as a protective measure once conduction has been started. The closing of the contactor 136 completes the circuit from the positive output terminal 151 of the power supply 91 to the anode of the oscillator tube 146. The circuit connections of such oscillator tube 146 are conventional so that an audio frequency voltage is transferred from the anode circuit to the load speaker 154 in pulses according to the operation of the relay 133.

In use the vapor detector is placed in the locale to be monitored after the foregoing adjustments and calibration have been satisfactorily accomplished. Usually it is desirable to operate without a constant observer and so the switch is set to position 31, audio alarm. Now with suitable power connected to the power supply 91 and the circuit otherwise in condition for operation, any mercury vapor present in the atmosphere will be drawn into the chamber 21 through the intake by the action of the fan 56. The mercury vapor present in the chamber 21 absorbs a portion of the ultraviolet light projected therethrough from the lamp 22. Such absorption results in an unbalance of light reaching the respective phototubes 13 and 14 and thereby causes a differential in voltage at the cathodes of the tubes 112 and 116 in the bridge circuit. When an unbalance voltage condition exists to such an extent that the relay 124 is energized a pulsed audio frequency sound is produced at the speaker 154 to warn that the toxic limit of mercury vapor in the atmosphere has been reached.

From the foregoing it will be readily apparent that a vapor detector has been provided which may be used for local warning either by indicating to an observer the presence of a toxic amount of vapor, or by generation of an audible warning signal, or further by remote warning as provided by the terminals 38 and 128 suitably connected to a remotely positioned indicator. It is also to be noted that the present vapor detector is extremely stable regardless of variations in line voltage because of the automatic start circuit for the ultraviolet lamp and the use of two phototubes viewing the same source of ultraviolet light.

While the salient features of the present invention have been described in detail with respect to one embodiment it will, of course, be apparent that numerous modifications may be made within the spirit and scope of the invention and it is therefore not desired to limit the invention to the exact details shown except insofar as they may be described in the following claims.

What is claimed is:

1. In a portable mercury vapor detector, the combination comprising a mercury vapor lamp, automatic starting means connected to said lamp, an elongated cylinder forming a sample chamber disposed with one end adjacent said lamp, a plurality of apertured baffles mounted in spaced-apart relation within said cylinder with the apertures in alignment, intake and outlet means mounted transversely of said cylinder at opposite ends thereof, a window transparent to ultraviolet light sealed across either end of said cylinder, blower means mounted on said outlet means to provide a continuous flow of air to be monitored through said cylinder, a tube disposed with one end adjacent said lamp, a second phototube disposed at the other end of said tube, a balanced parallel circuit including said first phototube in one branch and said second phototube in the other branch, a bridge circuit connected between equal voltage points of the branches of said balanced parallel circuit, and indicating means connected to said bridge circuit.

2. In a portable mercury vapor detector, the combination comprising a mercury vapor lamp, automatic starting means connected to said lamp, an elongated cylinder forming a sample chamber disposed with one end adjacent said lamp, a plurality of apertured baffles mounted in spaced-apart relation within said cylinder with the apertures in alignment, intake and outlet means mounted transversely of said cylinder at opposite ends thereof and communicating with said chamber, a window transparent to ultraviolet light sealed across either end of said cylinder, blower means mounted on said outlet means to provide a continuous flow of air to be monitored through said cylinder, a tube substantially shorter than said cylinder disposed with one end adjacent said lamp, means disposed within said tube to restrict the light passage therethrough, a second phototube disposed at the other end of said tube, a balanced parallel circuit including said first phototube in one branch and said second phototube in the other branch, a bridge circuit connected between equal voltage points of the branches of said balanced parallel circuit, and indicating means connected to said bridge circuit.

3. In a portable mercury vapor detector, the combination comprising a mercury vapor lamp, automatic starting means connected to said lamp, an elongated cylinder forming a sample chamber disposed with one end adjacent said lamp, a plurality of apertured baffles mounted transversely in spaced-apart relation within said cylinder with the apertures aligned along the axis thereof, intake and outlet pipes mounted transversely of said cylinder at opposite ends thereof and communicating with said chamber, blower means mounted on said outlet pipe to provide a continuous flow of air to be monitored through said chamber, a tube substantially shorter than said cylinder disposed transversely of said cylinder with one end adjacent said lamp, an adjustable iris disposed within said tube to restrict the light passage therethrough, a second phototube disposed at the other end of said tube, a balanced parallel circuit including said first phototube in one branch and said second phototube in the other branch, a bridge circuit connected between equal voltage points of the branches of said balanced parallel branches, a visual indicator, an audio alarm, and a selector switch connected to said bridge circuit and selectively to said indicator and audio alarm.

4. The combination of claim 3 wherein the automatic starting means for the mercury vapor lamp comprises a source of potential, circuit means for connecting the filaments of said lamp in series with ballast windings across said source of potential, said circuit means including a relay for interrupting the external series connection between the filaments of said lamp when an internal discharge between such filaments is established.

5. The combination of claim 3 wherein the automatic starting means for the mercury vapor lamp comprises a source of potential, a ballast unit having a first and a second winding, one end of said first winding being connected to one side of said source of potential and the other end being connected to one filament of said lamp, a relay having a solenoid and at least one normally closed contactor, said one filament being further connected to one side of said second winding through said contactor, the other side of said second winding being connected to the other filament of said lamp, such other filament being connected to the other side of said source of potential through said solenoid.

6. The combination of claim 3 wherein the automatic starting means for the mercury vapor lamp comprises a source of potential, a free running electronic oscillator connected across said source of potential, one filament of said lamp being connected to one side of the output of said oscillator and the other filament of said lamp being connected to the other side of said oscillator, and a ballast winding connected between the other connections of the two filaments of said lamp.

CECIL S. PRESENZ.

References Cited in the file of this patent

UNITED STATES PATENTS

| Number | Name | Date |
|---|---|---|
| 2,369,966 | Hawkins | Feb. 20, 1945 |
| 2,407,838 | Kliever | Sept. 17, 1946 |
| 2,617,940 | Giguere | Nov. 11, 1952 |
| 2,621,297 | Obermaier | Dec. 9, 1952 |
| 2,632,114 | Silvertooth | Mar. 17, 1953 |